United States Patent
Zhang et al.

(10) Patent No.: US 9,187,258 B2
(45) Date of Patent: Nov. 17, 2015

(54) FEEDING DEVICE

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Kun Zhang, Jiashan (CN); Ming-Lu Yang, New Taipei (TW)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/508,600

(22) Filed: Oct. 7, 2014

(65) Prior Publication Data

US 2015/0107964 A1  Apr. 23, 2015

(30) Foreign Application Priority Data

Oct. 17, 2013 (CN) ...................... 2013 2 0641122 U

(51) Int. Cl.
  *B65G 15/24* (2006.01)
  *B65G 1/00* (2006.01)
  *B65G 37/00* (2006.01)
  *B65G 23/24* (2006.01)

(52) U.S. Cl.
  CPC .............. *B65G 37/005* (2013.01); *B65G 23/24* (2013.01)

(58) Field of Classification Search
  CPC .......... B65G 15/14; B65G 1/00; B65G 47/61; B65G 2812/02227; B65G 2812/02128; B65G 37/005; B65G 2201/02
  USPC .............. 198/347.1, 606, 620, 817, 832, 835, 198/860.1
  See application file for complete search history.

(56) References Cited

U.S. PATENT DOCUMENTS

| | | | | |
|---|---|---|---|---|
| 2,889,033 | A * | 6/1959 | Berg, Jr. et al. ................ | 198/620 |
| 4,718,540 | A * | 1/1988 | Greenwell ..................... | 198/620 |
| 5,113,992 | A * | 5/1992 | Sadamori ....................... | 198/607 |
| 5,584,477 | A * | 12/1996 | Sakai .......................... | 198/626.1 |
| 6,308,820 | B1 * | 10/2001 | Munneke .................... | 198/626.2 |
| 8,905,221 | B2 * | 12/2014 | Young .......................... | 198/435 |
| 2005/0074321 | A1 * | 4/2005 | Anderson et al. .......... | 414/789.9 |
| 2014/0311868 | A1 * | 10/2014 | Pribyl .......................... | 198/620 |

\* cited by examiner

*Primary Examiner* — James R Bidwell
(74) *Attorney, Agent, or Firm* — Novak Druce Connolly Bove + Quigg LLP

(57) ABSTRACT

A feeding device includes a fixed frame, a drive mechanism, and a feeding mechanism. The drive mechanism includes a drive block, a first rotating shaft, a second rotating shaft; a connection chain, a driving component, a pushing component; a rotating component, and a gear. The driving component is connected to the first rotating shaft. The gear is connected to the feeding mechanism by the connection chain. The driving component rotates the first rotating shaft once, and the first rotating shaft rotates the pushing component once. The pushing component rotates the rotating component. The rotating component rotates the second rotating shaft, the gear, the connection chain, and the feeding mechanism at a predetermined frequency. The feeding mechanism puts the work-pieces on the conveying line at the predetermined frequency.

15 Claims, 4 Drawing Sheets

FEEDING DEVICE

FIELD

The subject matter herein generally relates to feeding devices, and in particular to a feeding device configured to use in automated production lines.

BACKGROUND

A feeding device is configured to feed work-pieces to the production lines. During a production process, the work-pieces are usually placed in feeding trays. Then, the feeding trays are fed manually to the production lines.

BRIEF DESCRIPTION OF THE DRAWINGS

Implementations of the present technology will now be described, by way of example only, with reference to the attached figures.

DETAILED DESCRIPTION

Figure 1:
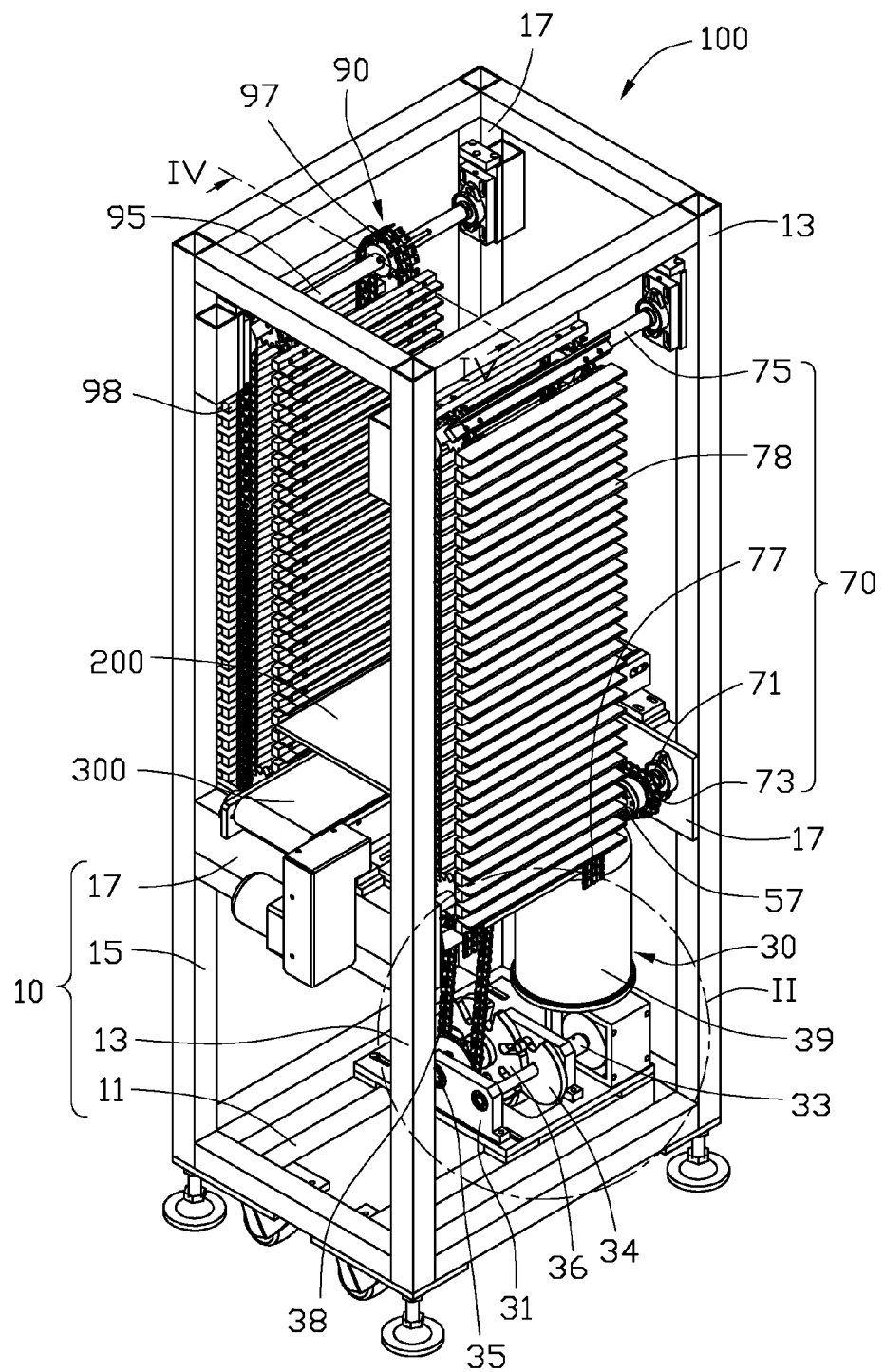
FIG. 1 is an isometric view of an embodiment of a feeding device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates an embodiment of a feeding device 100. The feeding device 100 can be configured to feed work-pieces 200 in a predetermined frequency to a conveying line 300. The feeding device 100 can include a fixed frame 10, a drive mechanism 30, a transmission mechanism 50, a first feeding mechanism 70, and a second feeding mechanism 90. The drive mechanism 30, the transmission mechanism 50, the first feeding mechanism 70, and the second feeding mechanism 90 can be mounted to the fixed frame 10. The transmission mechanism 50 can be connected to the drive mechanism 30. The first feeding mechanism 70 and the second feeding mechanism 90 can be connected to the transmission mechanism 50. The drive mechanism 30 can power the transmission mechanism 50 to drive the first feeding mechanism 70 and the second feeding mechanism 90. The first feeding mechanism 70 and the second feeding mechanism 90 can therefore feed the work-pieces 200 to the conveying line 300.

The fixed frame 10 can include a fixing plate 11, two first fixing rods 13, two second fixing rods 15, and two connecting plates 17. The two first fixing rods 13 can be vertically mounted to one side of the fixing plate 11, and can be arranged in parallel. The two second fixing rods 15 can be vertically mounted to the other side of the fixing plate 11, and can be arranged in parallel. Each connecting plate 17 can be mounted between one of the two first fixing rods 13 and the corresponding second fixing rod 15, and the two connecting plates 17 can be relatively arranged. The conveying line 300 can be mounted on the two connecting plates 17.

Figure 2:
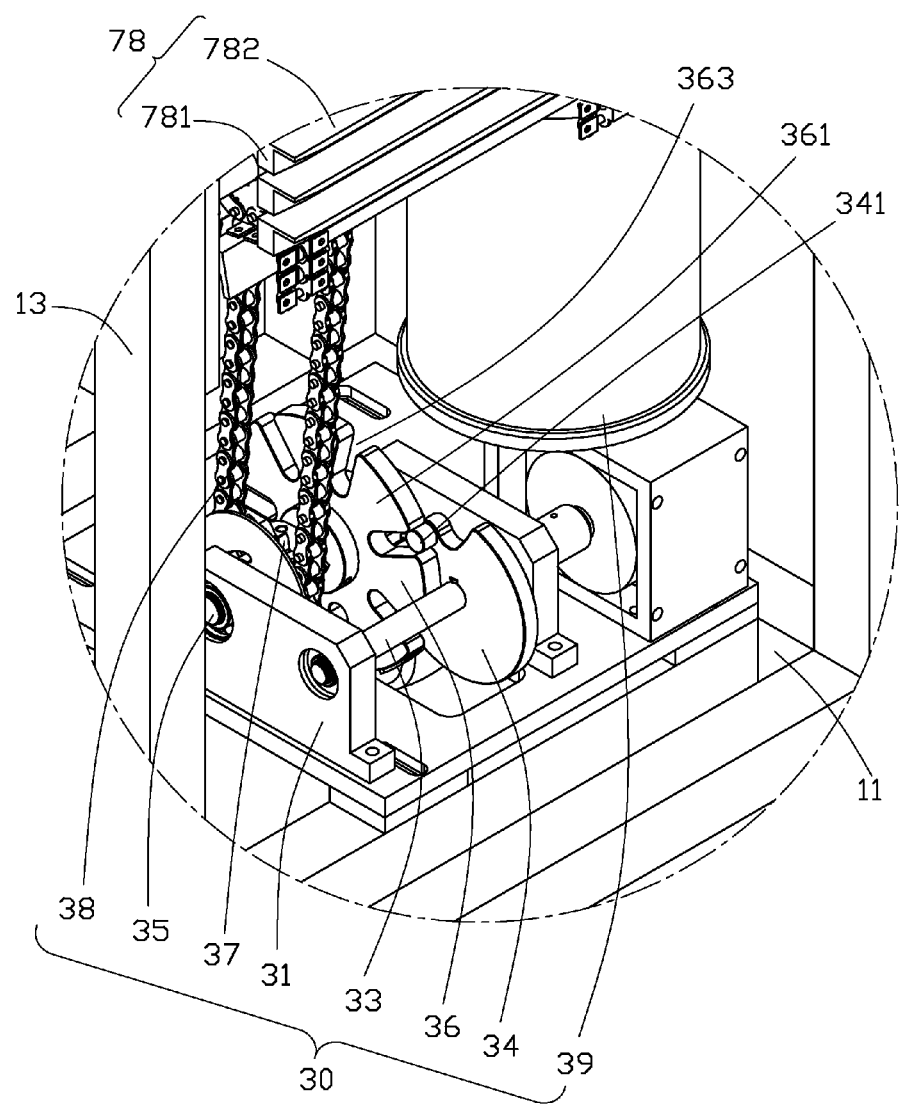
FIG. 2 is an enlarged view of circled portion II of FIG. 1.

FIG. 2 illustrates that the drive mechanism 30 can be mounted to the fixing plate 11. The drive mechanism 30 can include two drive blocks 31, a first rotating shaft 33, a pushing component 34; a second rotating shaft 35, a rotating component 36, a gear 37; a connection chain 38, and a driving component 39. The two drive blocks 31 can be mounted relative to the fixing plate 11. The first rotating shaft 33 can rotationally pass through the two drive blocks 31, and can be mounted between the two drive blocks 31. The pushing component 34 can be mounted to the first rotating shaft 33. One side of the pushing component 34 can include a raised portion 341, and the raised portion 341 can be substantially parallel with the first rotating shaft 33. The second rotating shaft 35 can rotationally pass through the two drive blocks 31, and can be mounted between the two drive blocks 31. The second rotating shaft 35 can be substantially parallel with the first rotating shaft 33. The rotating component 36 can be mounted to the second rotating shaft 35. In the illustrated embodiment, the rotating component 36 can be substantially fan like. The rotating component 36 can include a plurality of blades 361. The blades 361 can be arranged in predetermined intervals. An opening 363 can be defined between the two blades 361. The raised portion 341 can be received in the opening 363. When the rotating component 36 is rotated, the blades 361 can be pushed to allow the second rotating shaft 35 to rotate relative to the two drive blocks 31. The gear 37 can be arranged with the second rotating shaft 35, and can be arranged relative to the rotating component 36. The connection chain 38 can be engaged with the gear 37 and the transmission mechanism 50 (see FIG. 1). The driving component 39 can be mounted to the fixing plate 11, and can be mechanically coupled to the first rotating shaft 33. The driving component 39 can rotate the first rotating shaft 33 once, and the first rotating shaft 33 can rotate the pushing component 34 once. The raised portion 341 can rotate the blades 361, and allow the rotating component 36 to drive the second rotating shaft 35 and the gear 37 at a predetermined frequency.

Figure 3:
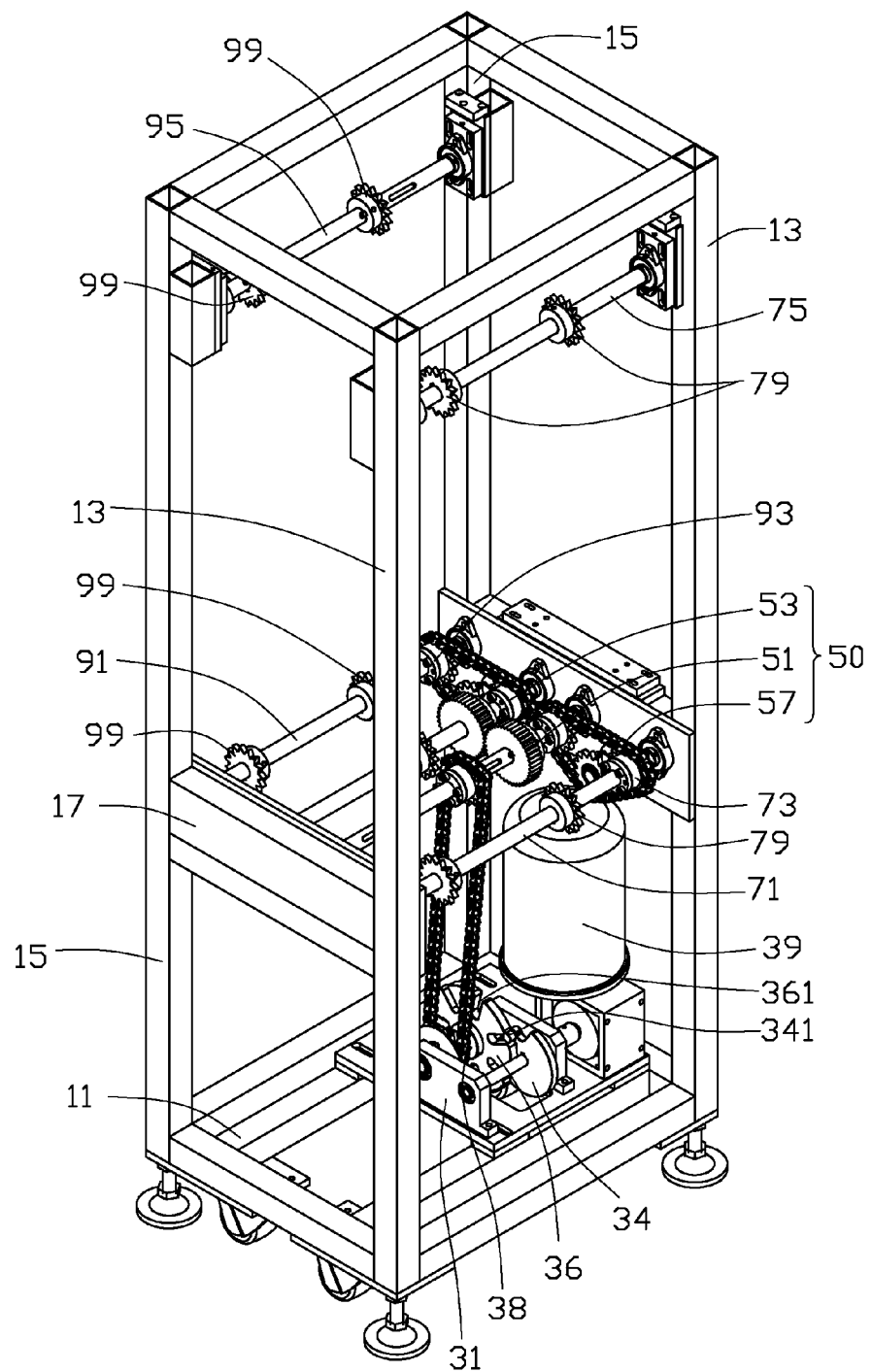
FIG. 3 is a partial perspective view of the feeding device of FIG. 1.

FIG. 3 illustrates that the transmission mechanism 50 can be mounted to the fixed frame 10. The transmission mechanism 50 can include a first transmission component 51, a second transmission component 53, and two transmission chains 57. The first transmission component 51 can be mounted between the two connecting plates 17, and can be rotated relative to the two connecting plates 17. The first transmission component 51 can be located under the conveying line 300. The second transmission component 53 can be mounted between the two connecting plates 17, and can be rotated relative to the two connecting plates 17. The second transmission component 53 can be engaged with the first transmission component 51, and can be located under the conveying line 300. The first transmission component 51 can rotate the second transmission component 53. One of the two transmission chains 57 can be engaged with the first transmission component 51 and the first feeding mechanism 70 (see FIG. 1) to allow the first transmission component 51 to rotate the first feeding mechanism 70. The other transmission chain 57 can be engaged with the second transmission component 53 and the second feeding mechanism 90 (see FIG. 1) to allow the second transmission component 53 to rotate the second feeding mechanism 90.

The first feeding mechanism 70 (see FIG. 1) can include a third rotating shaft 71, a first connecting gear 73, a fourth rotating shaft 75, and a plurality of first gears 79. The third rotating shaft 71 can be mounted between the two first fixing rods 13 adjacent to the connecting plate 17. The third rotating shaft 71 can be rotated relative to the two first fixing rods 13. The third rotating shaft 71 can include two first gears 79 arranged in predetermined intervals. The first connecting gear 73 can be mounted to the third rotating shaft 71. The transmission chain 57 can be connected to the first transmission component 51 and the first connecting gear 73. The first transmission component 51 can rotate the first connecting gear 73 through the transmission chain 57. The fourth rotating shaft 75 can be mounted between the two first fixing rods 13, and can be rotated relative to the two first fixing rods 13. The fourth rotating shaft 75 can be substantially parallel with the third rotating shaft 71. The fourth rotating shaft 75 can include two first gears 79 arranged in predetermined intervals.

The second feeding mechanism 90 (see FIG. 1) can include a fifth rotating shaft 91, a second connecting gear 93, a sixth rotating shaft 95, and a plurality of second gears 99. The fifth rotating shaft 91 can be mounted between the two second fixing rods 15 adjacent to the connecting plate 17. The fifth rotating shaft 91 can be rotated relative to the two second fixing rods 15. The fifth rotating shaft 91 can include two second gears 99 arranged in predetermined intervals. The second connecting gear 93 can be mounted to the fifth rotating shaft 91. The transmission chain 57 can be connected to the second transmission component 53 and the second connecting gear 93. The second transmission component 53 can rotate the second connecting gear 93 via the transmission chain 57. The sixth rotating shaft 95 can be mounted between the two second fixing rods 15, and can be rotated relative to the two second fixing rods 15. The sixth rotating shaft 95 can be substantially parallel with fifth rotating shaft 91. The sixth rotating shaft 95 can include two second gears 99 arranged in predetermined intervals.

Figure 4:
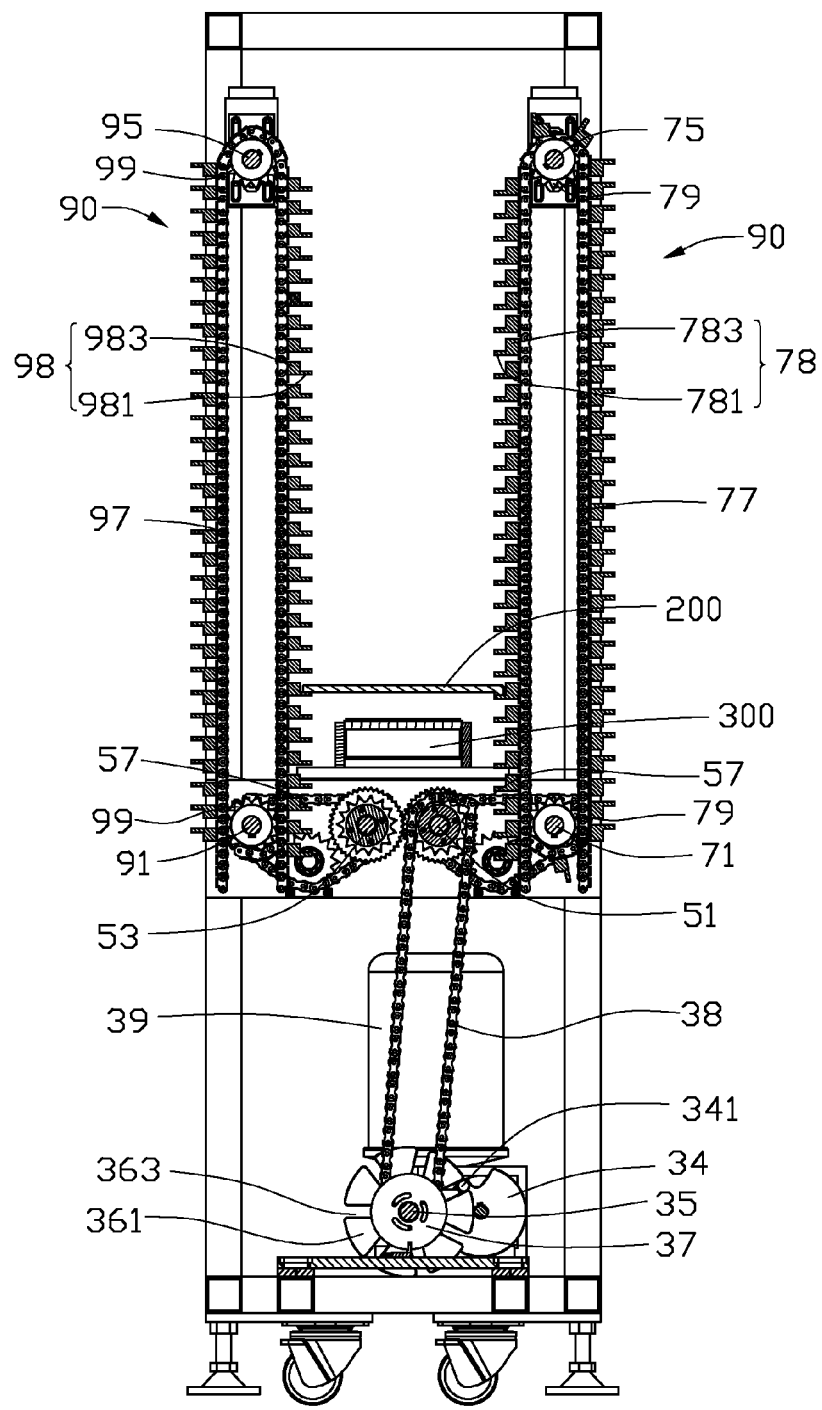
FIG. 4 is a cross-sectional view of the feeding device of FIG. 1 taken along line IV-IV.

FIG. 4 illustrates that the first feeding mechanism 70 can further include two first transmission chains 77 and a plurality of first support components 78. Each first transmission chain 77 can be engaged with the first gears 79 to allow the third rotating shaft 71 to rotate the fourth rotating shaft 75. The first support components 78 can be mounted to the two first transmission chains 77 one at a time. The first support components 78 can be substantially "L"-shaped. Each first support component 78 can include a first fixing portion 781 and a first support portion 783. The first fixing portion 781 can vertically extend to form the first support portion 783. Two ends of the first fixing portion 781 can be connected to the first transmission chains 77. The first support portion 783 can be configured to support the work-pieces 200.

The second feeding mechanism 90 can further include two second transmission chains 97 and a plurality of second support components 98. Each second transmission chains 97 can be engaged with the second gears 99 to allow the fifth rotating shaft 91 to rotate the sixth rotating shaft 95. The second support components 98 can be mounted to the two second transmission chains 97 one-by-one. The second support components 98 can be substantially "L"-shaped. Each second support components 98 can include a second fixing portion 981 and a second support portion 983. The second fixing portion 981 can vertically extend to form the second support portion 983. Two ends of the second fixing portion 981 can be connected to the second transmission chains 97. The second support portion 983 can be configured to support the work-pieces 200.

In operation, the driving component 39 can rotate the first rotating shaft 33 (see FIG. 2), and the first rotating shaft 33 can rotate the pushing component 34. The raised portion 341 of the pushing component 34 can be received in the opening 363 of the rotating component 36 (see FIG. 2), and the raised portion 341 can rotate the rotating component 36. The rotating component 36 can rotate the second rotating shaft 35 and the gear 37 at a predetermined frequency. The gear 37 can rotate the first transmission component 51 via the connection chain 38. The first transmission component 51 can rotate the second transmission component 53 and the two transmission chains 57. The two transmission chains 57 can synchronously rotate the third rotating shaft 71 and the fifth rotating shaft 91. The third rotating shaft 71 can rotate the two first transmission chains 77. The two first transmission chains 77 can allow the first support components 78 to move toward the conveying line 300. The fifth rotating shaft 91 can rotate the two second transmission chains 97. The two second transmission chains 97 can allow the second support components 98 to move toward the conveying line 300. The second support portion 983 and the first support portion 783 can be at the same level, and can be moved at a same frequency. The second support portion 983 and the first support portion 783 can combine to support the work-piece 200, and put the work-piece 200 on the conveying line 300. The feeding device 100 can carry out this cycle continuously to put the work-pieces 200 on the conveying line 300.

The embodiments shown and described above are only examples. Many details are often found in the art such as the other features of a feeding device 100. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A feeding device for feeding work pieces to a conveying line, the feeding device comprising:
   a fixed frame;
   a drive mechanism having:
     a drive block mounted on the fixed frame;
     a connection chain;

a first rotating shaft and a second rotating shaft, the first rotating shaft and the second rotating shaft mounted on the drive block;

a driving component mounted on the drive block and mechanically coupled to the first rotating shaft;

a pushing component mounted on the first rotating shaft with a raised portion extending out substantially parallel to the first shaft;

a gear mounted on the second rotating shaft; and a rotating component mounted on the second rotating shaft, the rotating component having a plurality of blades extending out from the second rotating shaft and radially arranged at predetermined intervals; and a feeding mechanism configured to support a work piece;

wherein, the gear is engaged with the feeding mechanism by the connection chain;

wherein, when the pushing component is rotated, the raised portion of the pushing component engages the rotating component rotating the second rotating shaft and the gear; and wherein, rotation of the gear moves the connection chain moving the feeding mechanism to place a work piece on the conveying line at a predetermined speed.

2. The feeding device as claimed in claim 1, wherein the feeding mechanism comprises a first feeding mechanism and a second feeding mechanism, and the first feeding mechanism and the second feeding mechanism are mounted relative to the fixed frame in parallel.

3. The feeding device as claimed in claim 2, wherein further comprises a transmission mechanism connected to the drive mechanism.

4. The feeding device as claimed in claim 3, wherein the transmission mechanism comprises a first transmission component, a second transmission component, and two transmission chains.

5. The feeding device as claimed in claim 4, wherein
the first transmission component and the second transmission component are rotationally mounted to the fixed frame;
the second transmission component is engaged with the first transmission component;
one of the transmission chains is connected to the first transmission component and the first feeding mechanism, and is meshed to the first transmission component and the first feeding mechanism;
the other transmission chain is connected to the second transmission component and the second feeding mechanism, and is meshed to the second transmission component and the second feeding mechanism.

6. The feeding device as claimed in claim 5, wherein the first feeding mechanism comprises a third rotating shaft, a first connecting gear, a fourth rotating shaft, a plurality of first transmission chains, and a plurality of first support components.

7. The feeding device as claimed in claim 6, wherein
the third rotating shaft and the fourth rotating shaft are rotationally mounted to the fixed frame in predetermined intervals;
the first connecting gear is mounted to the third rotating shaft;
one of the transmission chains is connected to first transmission component and the first connecting gear to allow the first transmission component to rotate the third rotating shaft;
the first connecting gear is connected to the third rotating shaft and the fourth rotating shaft;
the first support components are mounted to the first transmission chains one-by-one to support the work-pieces.

8. The feeding device as claimed in claim 7, wherein each first support component comprises a first fixing portion and a first support portion, and the first fixing portion can vertically extend to form the first support portion.

9. The feeding device as claimed in claim 8, wherein the first fixing portion is fixed to the first transmission chains, and each first support portion is configured to support the work-piece.

10. The feeding device as claimed in claim 5, wherein the second feeding mechanism comprises a fifth rotating shaft, a second connecting gear, a sixth rotating shaft, a plurality of second transmission chains, and a plurality of second support components.

11. The feeding device as claimed in claim 10, wherein
the fifth rotating shaft and the sixth rotating shaft are rotationally mounted to the fixed frame in predetermined intervals;
the second connecting gear is mounted to the fifth rotating shaft;
one of the transmission chains is connected to the second transmission component and the second connecting gear to allow the second transmission component to rotate the fifth rotating shaft;
the second support components are mounted to the second transmission chains one-by-one to support the work-piece.

12. The feeding device as claimed in claim 11, wherein each second support components comprises a second fixing portion and a second support portion, and the second fixing portion can vertically extend to form the second support portion.

13. The feeding device as claimed in claim 12, wherein the second fixing portion is fixed to the second transmission chains, and each second support portion is configured to support the work-piece.

14. The feeding device as claimed in claim 7, wherein the third rotating shaft and the fourth rotating shaft comprise a plurality of first gears, and the transmission chains is engaged with the gears.

15. The feeding device as claimed in claim 11, wherein the fifth rotating shaft and the sixth rotating shaft comprise a plurality of second gears, and the transmission chains is engaged with the second gears.

* * * * *